US012247157B2

United States Patent
Benkley et al.

(10) Patent No.: US 12,247,157 B2
(45) Date of Patent: Mar. 11, 2025

(54) BIOLOGICALLY DERIVED CEMENT RETARDER

(71) Applicant: Halliburton Energy Services, Inc., Houston, TX (US)

(72) Inventors: James Robert Benkley, Duncan, OK (US); Ronnie G. Morgan, Waurika, OK (US); Thomas Jason Pisklak, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/866,311

(22) Filed: Jul. 15, 2022

(65) Prior Publication Data

US 2024/0018409 A1 Jan. 18, 2024

(51) Int. Cl.
C09K 8/467 (2006.01)

(52) U.S. Cl.
CPC .................. *C09K 8/467* (2013.01)

(58) Field of Classification Search
CPC . C09K 8/467; C04B 40/0666; C04B 2103/20; C04B 2103/22
See application file for complete search history.

(56) References Cited

U.S. PATENT DOCUMENTS

| 2011/0028607 A1* | 2/2011 | Morgan | C04B 40/0039 106/692 |
| 2012/0325120 A1* | 12/2012 | Shendy | C04B 40/0039 106/804 |

FOREIGN PATENT DOCUMENTS

| CN | 106746826 A | * | 5/2017 | ......... C04B 40/0039 |
| CN | 108585591 A | * | 9/2018 | ......... C04B 40/0039 |
| CN | 109136292 B | * | 11/2021 | ........... C04B 24/001 |

OTHER PUBLICATIONS

Pathan, et al. "Using Molasses in Concrete As a Time Retarding Admixture", International Journal of Engineering Research & Technology (IJERT), ISSN: 2278-0181, vol. 6, Issue 11, Nov. 2017.

* cited by examiner

*Primary Examiner* — Crystal J Lee
(74) *Attorney, Agent, or Firm* — The Hilton Firm PLLC (57) ABSTRACT

Methods for cementing. An example method provides a cement composition comprising an aqueous fluid, a cement, and a cement retarder; wherein the cement retarder is a waste residue from a manufacturing process of a sweetener and comprises a sugar concentration of at least 40%, a Brix value of at least 60, a nitrogen-free extract concentration of at least 50%, a total solids concentration of at least 60%, a crude protein concentration less than 10%, a fat concentration less than 5%, a fiber concentration less than 5%, and an ash concentration less than 10%. The method also introduces the cement composition into a wellbore penetrating a subterranean formation and pumps the cement composition to a location within the wellbore, and allows the cement composition to set in the location.

8 Claims, 5 Drawing Sheets

BIOLOGICALLY DERIVED CEMENT RETARDER

TECHNICAL FIELD

The present disclosure relates generally to cementing operations, and more particularly, to the use of a cement retarder derived from the waste stream of the manufacturing process of a sweetener.

BACKGROUND

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protect the pipe string from corrosion. Cement compositions also may be used in remedial cementing methods, for example, to seal cracks or holes in pipe strings or cement sheaths, to seal highly permeable formation zones or fractures, to place a cement plug, and the like.

Subterranean cementing operations generally occur under a wide variety of wellbore conditions ranging from shallow wells (less than about 1,000 feet) to extremely deep wells (greater than about 35,000 feet). A cement retarder may be included in a cement composition to retard the set time of the cement composition until the cement composition has reached its ultimate location within the subterranean formation. Some cement retarders may be produced from the chemical modification of a natural starting material, may be entirely synthetic and produced from chemical manufacturing techniques, or may be chemically purified from a starter material. Some of these chemical processes may add to the carbon footprint of the cement retarder and increase production costs. Additionally, some cement retarders may lack suspension properties and/or may be unsuitable for use in some wellbore environments such as low temperature wellbores.

Regardless, the successful retardation of the cement composition is important to help prevent premature setting and to help ensure a desired placement. The present invention provides improved methods and compositions for retarding a cement composition.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates generally to cementing operations, and more particularly, to the use of a cement retarder derived from the waste stream of the manufacturing process of a sweetener.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The examples described herein relate to the use of a cement retarder derived from the waste stream of the manufacturing process of a sweetener. The cement composition comprises a cement retarder. The cement retarder is a residue derived from the waste stream of the manufacturing process of a sweetener, for example, the waste residue of the molasses extraction process which is discussed in greater detail below. Advantageously, the cement retarder has a low carbon footprint. As the cement retarder is a waste product from the manufacturing process of a sweetener, it may be discarded if not used as a cement retarder; however, the methods described herein provide a use for this waste product thereby reducing agricultural waste from the aforementioned manufacturing processes. A further advantage is that the cement retarder does not require chemical modification or derivatization after extraction and may be used directly in the cement composition after drying and grinding/sieving. A further advantage is that the cement retarder functions sufficiently in most wellbore environments including low temperature wellbore environments and retains consistent thickening times over a broad spectrum of wellbore environments. A "low temperature" wellbore environment, as used herein, refers to a wellbore temperature of 35° C. or less. An additional advantage is that the cement retarder retains pumpability in most wellbore environments and does not become too viscous in low temperature environments. A still further advantage is that the cement retarder may increase the suspension capabilities of the cement composition, thereby reducing or eliminating the need to include suspending aids in some formulations. One further advantage is that a lesser volume of the cement retarder may achieve equivalent or better results than higher volumes of comparable cement retarders, thereby further reducing the carbon footprint of the cement retarder.

The cement retarder is a waste residue derived from the waste stream of the manufacturing process of a sweetener from any fruit, vegetable, or fiber, for example, the waste residue produced as a by-product of any molasses extraction process, the by-product from the production of dry granular sugar from sugar cane, the by-product from the production of concentrated maple syrup from maple sap, the by-product from the production of granular concentrated sweetener from plant leaves, etc. The term "sweetener" and all derivatives thereof include any and all types of syrup. The waste residue comprises a sugar concentration of at least 40% sugar, a Brix value of at least 60, a nitrogen-free extract concentration of at least 50%, and a total solids concentration of at least 60%. The waste residue further comprises less than 10% crude protein, less than 5% fat, less than 5% fiber, and less than 10% ash. The sugar content may be any sugar including sucrose, glucose, fructose, raffinose, dextrose, and the like. The source for the sweetener may be any fruit, vegetable, or fiber. Examples of these sources may include, but are not limited to, sugar cane, beet, maize, grain sorghum, stevia, pineapple, and others. If the manufacturing process is a molasses extraction process, any species of molasses source may be used to provide the waste residue. Examples of the molasses species may include, but are not limited to, cane molasses, sugar beet molasses, fruit molasses, citrus molasses, starch molasses, unsulfured molasses, hemicellulose extract, beet molasses, grain molasses, sorghum molasses, and the like. After the sweetener is extracted, the waste residue remains. This waste residue may then be further processed via drying and grinding/sieving to produce the cement retarder. The sweetener extraction and waste processing are described in detail below and illustrated by FIG. 4. The waste residue left behind by the sweetener extraction process comprises the remaining sugar and protein of the original source, for example, the remaining sugar and protein of the sugar cane, beet, maize, etc. The waste residue may be a liquid, a slurry, dried agglomerated particles, dried fine powders, dried granulated particles, dried extruded pellets, and the like depending on the type of extraction process used. The waste residue may then be further processed by any suitable drying operation and afterwards may be ground or sieved to produce a cement retarder product of appropriate size and shape for downhole conveyance in a cement composition or treatment fluid. In some optional examples, additional processing of the waste product may occur including solidifying the waste product, condensing the waste product, filtering the waste product, or any other such processing operation. If the waste product is filtered, the filtrate or filtride may be used as the cement retarder depending on the waste product that was filtered. The processing may comprise or consist of any combination of the above processes.

As the cement retarder is a product of the waste stream of the sweetener manufacturing process, the cement retarder may be obtained at low cost and may provide an overall reduction in carbon footprint compared to traditional cement retarders. Generally, the cement retarder may be present in the cement composition in an amount sufficient to delay the setting of the cement composition for a desired time. Additionally, the cement retarder may assist in improving the suspension properties of the cement composition. As such, less of, or a total lack of suspending aids and/or viscosifiers may be needed to sufficiently prepare a cement composition having a suitable viscosity.

The concentration of the cement retarder in the cement composition may range from about 0.1% to about 15% by weight of cement. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the cement retarder in the cement composition may range, from about 0.1% to about 15% by weight of cement, from about 1% to about 15% by weight of cement, from about 3% to about 15% by weight of cement, from about 5% to about 15% by weight of cement, or from about 10% to about 15% by weight of cement. As another example, the concentration of the cement retarder in the cement composition may range from about 0.1% to about 15% by weight of cement, from about 0.1% to about 10% by weight of cement, from about 0.1% to about 5% by weight of cement, from about 0.1% to about 3% by weight of cement, or from about 0.1% to about 1% by weight of cement. With the benefit of this disclosure, one of ordinary skill in the art will be readily able to prepare a cement composition having a sufficient concentration of cement retarder for a given application.

The cement composition comprises a cement. The cement may be any cement suitable for use in subterranean applications. In some examples, cements suitable for use in surface applications (e.g., construction cements) may also be used. In some examples the cement is a hydraulic cement. A variety of hydraulic cements may be suitable for use including, but not limited to, those comprising one or more of calcium, aluminum, silicon, oxygen, and sulfur, which set and harden by reaction with water. Specific examples of hydraulic cements include, but are not limited to, Portland cements, pozzolanic cements, gypsum cements, high alumina content cements, silica cements, high alkalinity cements, slag cements, shale cements, cement kiln dust, or combinations thereof. In some examples, the hydraulic cement may comprise an API cement, such as API Classes A, B, C, G, H, J, K, and L Portland cements or equivalents thereof. The above-mentioned API cements are defined and described in API Specification for Materials and Testing for Well Cements, API Specification 10A, Twenty-Fifth Edition, 2019. Additional examples of suitable Portland cements may include those classified as ASTM Type I, II, III, IV, I/II, V, or 1L.

Some examples of the cement may comprise pumice, a pozzolanic cementitious material. Generally, pumice is a volcanic rock that can exhibit cementitious properties in that it may set and harden in the presence of hydrated lime and water. The pumice may also be ground or co-ground with various types of cements or other pozzolanic materials Generally, the pumice may have any particle size distribution as desired for a particular application. In certain embodiments, the pumice may have a d50 particle size distribution in a range of from about 1 micron to about 200 microns. The d50 values may be measured by particle size analyzers such as those manufactured by Malvern Instruments, Worcestershire, United Kingdom. In some specific examples, the pumice may have a d50 particle size distribution in a range of from about 1 micron to about 200 microns, from about 5 microns to about 100 microns, or from about 10 microns to about 25 microns. In one particular example, the pumice may have a d50 particle size distribution of about 15 microns or less. It should be appreciated that particle sizes too small may have mixability problems while particle sizes too large may not be effectively suspended in the compositions. One of ordinary skill in the art, with the benefit of this disclosure, should be able to select a particle size for the pumice suitable for a chosen application.

Some examples of the cement may comprise slag. Slag is generally a granulated, blast furnace by-product from the production of cast iron comprising the oxidized impurities found in iron ore.

Some examples of the cement may comprise fly ash. Fly ash is a pozzolanic cementitious material. A variety of fly ash may be suitable, including fly ash classified as Class C and Class F fly ash according to American Petroleum Institute, API Specification for Materials and Testing for Well Cements, API Specification 10A, Twenty-Fifth Edition, 2019. Class C fly ash comprises both silica and lime, so it may set to form a hardened mass upon mixing with water. Class F fly ash generally does not contain a sufficient amount of lime to induce a cementitious reaction; therefore, an additional source of calcium ions is necessary for a cement composition comprising Class F fly ash. In some examples, lime may be mixed with Class F fly ash in an amount in the range of about 0.1% to about 100% by weight of the fly ash. In some instances, the lime may be hydrated lime.

Some examples of the cement may comprise a high alumina content cement. In some examples the high alumina cement comprises a calcium aluminate. The calcium aluminate may be any calcium aluminate suitable for use as a cement. The high alumina content cement may further comprise a soluble phosphate. Among other things, it is believed that the soluble phosphate should react with the high alumina content cement to form a set cement that may be resistant to carbon dioxide. For example, calcium aluminate should react with sodium polyphosphate to form a calcium phosphate cement. Any type of soluble phosphate may be included in the high alumina content cement including, but are not limited to, vitreous sodium phosphates, sodium hexametaphosphates, sodium polyphosphates, sodium dihydrogen phosphates, sodium monohydrogen phosphates, or combinations thereof. Other soluble alkali phosphates may also be suitable for use.

The concentration of the cement in the cement composition may range from about 0.5% (w/v) to about 85% (w/v). The concentration of the cement in the cement composition may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the cement in the cement composition may range from about 0.5% (w/v) to about 85% (w/v), from about 1% (w/v) to about 85% (w/v), from about 5% (w/v) to about 85% (w/v), from about 10% (w/v) to about 85% (w/v), from about 15% (w/v) to about 85% (w/v), from about 20% (w/v) to about 85% (w/v), from about 25% (w/v) to about 85% (w/v), from about 30% (w/v) to about 85% (w/v), from about 35% (w/v) to about 85% (w/v), from about 40% (w/v) to about 85% (w/v), from about 45% (w/v) to about 85% (w/v), from about 50% (w/v) to about 85% (w/v), from about 55% (w/v) to about 85% (w/v), from about 60% (w/v) to about 85% (w/v), from about 65% (w/v) to about 85% (w/v), from about 70% (w/v) to about 85% (w/v), from about 75% (w/v) to about 85% (w/v), or from about 80% (w/v) to about 85% (w/v). As another example, the concentration of the cement in the cement composition may range from about 0.5% (w/v) to about 85% (w/v), from about 0.5% (w/v) to about 80% (w/v), from about 0.5% (w/v) to about 75% (w/v), from about 0.5% (w/v) to about 70% (w/v), from about 0.5% (w/v) to about 65% (w/v), from about 0.5% (w/v) to about 60% (w/v), from about 0.5% (w/v) to about 55% (w/v), from about 0.5% (w/v) to about 50% (w/v), from about 0.5% (w/v) to about 45% (w/v), from about 0.5% (w/v) to about 40% (w/v), from about 0.5% (w/v) to about 35% (w/v), from about 0.5% (w/v) to about 30% (w/v), from about 0.5% (w/v) to about 25% (w/v), from about 0.5% (w/v) to about 20% (w/v), from about 0.5% (w/v) to about 15% (w/v), from about 0.5% (w/v) to about 10% (w/v), from about 0.5% (w/v) to about 5% (w/v), or from about 0.5% (w/v) to about 1% (w/v). With the benefit of this disclosure, one of ordinary skill in the art will be able to prepare a cement composition having a sufficient concentration of cement for a given application.

The cement composition comprises an aqueous fluid. The aqueous fluid may be from any source, provided that it does not contain an excess of compounds that may undesirably affect other components in the cement composition. In various examples, the aqueous fluid may comprise fresh water, salt water, seawater, brine, or an aqueous salt solution. In some examples, the aqueous fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like.

The concentration of the aqueous fluid in the cement composition may range from about 0.5% (w/v) to about 85% (w/v). The concentration of the aqueous fluid in the cement composition may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous fluid in the cement composition may range from about 0.5% (w/v) to about 85% (w/v), from about 1% (w/v) to about 85% (w/v), from about 5% (w/v) to about 85% (w/v), from about 10% (w/v) to about 85% (w/v), from about 15% (w/v) to about 85% (w/v), from about 20% (w/v) to about 85% (w/v), from about 25% (w/v) to about 85% (w/v), from about 30% (w/v) to about 85% (w/v), from about 35% (w/v) to about 85% (w/v), from about 40% (w/v) to about 85% (w/v), from about 45% (w/v) to about 85% (w/v), from about 50% (w/v) to about 85% (w/v), from about 55% (w/v) to about 85% (w/v), from about 60% (w/v) to about 85% (w/v), from about 65% (w/v) to about 85% (w/v), from about 70% (w/v) to about 85% (w/v), from about 75% (w/v) to about 85% (w/v), or from about 80% (w/v) to about 85% (w/v). As another example, the concentration of the aqueous fluid in the cement composition may range from about 0.5% (w/v) to about 85% (w/v), from about 0.5% (w/v) to about 80% (w/v), from about 0.5% (w/v) to about 75% (w/v), from about 0.5% (w/v) to about 70% (w/v), from about 0.5% (w/v) to about 65% (w/v), from about 0.5% (w/v) to about 60% (w/v), from about 0.5% (w/v) to about 55% (w/v), from about 0.5% (w/v) to about 50% (w/v), from about 0.5% (w/v) to about 45% (w/v), from about 0.5% (w/v) to about 40% (w/v), from about 0.5% (w/v) to about 35% (w/v), from about 0.5% (w/v) to about 30% (w/v), from about 0.5% (w/v) to about 25% (w/v), from about 0.5% (w/v) to about 20% (w/v), from about 0.5% (w/v) to about 15% (w/v), from about 0.5% (w/v) to about 10% (w/v), from about 0.5% (w/v) to about 5% (w/v), or from about 0.5% (w/v) to about 1% (w/v). With the benefit of this disclosure, one of ordinary skill in the art will be able to prepare a cement composition having a sufficient concentration of aqueous fluid for a given application.

Some examples of the cement composition may comprise a calcium ion source. Suitable calcium ion sources may comprise any compound such as a calcium-containing salt or other species that is capable of dissociation to give calcium ions. In some examples, the calcium ion source may be capable of reacting with any other constituent of the cement composition as to form a cementitious material. For example, suitable calcium ion sources may be capable of reacting with pumice in the presence of water so as to form a cementitious material. Examples of calcium ion sources include, but are not limited to, hydrated lime (which may alternatively be referred to as calcium hydroxide, slaked lime, builder's lime, and/or slack lime); quick lime (which may alternatively be referred to as, e.g., calcium oxide); and calcium salts in the presence of a hydroxide ion source. Calcium salts according to some examples may be of the form $CaX_2$, where X is an anion with a formal charge of −1 (e.g., $CaBr_2$, $CaF_2$, $CaI_2$, $CaCl_2$). Calcium salts according to other embodiments may be of the form CaX, where X is an anion with a formal charge of −2 (e.g., carbonate anion $CO_3^{-2}$). In some examples, a calcium ion source may be accompanied by or otherwise combined with a hydroxide ion source in the cement composition. Such a source may include a hydroxide salt of an alkali or alkaline earth element. Suitable hydroxide salts include sodium hydroxide, potassium hydroxide, and calcium hydroxide. In certain examples, the calcium ion source may be included in a cement composition and subjected to alkaline conditions (for example, in order to support a pozzolanic reaction between the calcium ion source and the pozzolan of some example cement compositions). In some examples, the calcium ion source itself may be alkaline or may, upon disassociation, create alkaline conditions (e.g., such as would occur upon the dissociation of calcium hydroxide).

Where present, the calcium ion source may be included in the cement composition in an amount in the range of from about 10% to about 100% by weight of the cement. In some examples, the calcium ion source may be present in an amount ranging between any of and/or including any of about 10%, about 20%, about 40%, about 60%, about 80%, or about 100% by weight of the cement. One of ordinary skill in the art, with the benefit of this disclosure, will recognize the appropriate amount of the calcium ion source to include for a chosen application.

Some optional examples of the cement compositions may comprise a secondary cement retarder, for example, to assist the above discussed residue derived from a waste stream in delaying the setting and/or retarding the cement composition. A broad variety of secondary cement retarders may be suitable for use in the cement composition. For example, the secondary cement retarder may comprise phosphonic acids, such as amino tris(methylene phosphonic acid), ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose ("HEC") and carboxymethyl hydroxyethyl cellulose ("CMHEC"); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable secondary cement retarders include, among others, phosphonic acid derivatives. Generally, the secondary cement retarder may be present in the cement composition in an amount sufficient to delay the setting of the cement composition for a desired time. In some examples, the secondary cement retarder may be present in the cement composition in an amount in the range of from about 0.01% to about 10% by weight of the cement. In specific embodiments, the secondary cement retarder may be present in an amount ranging between any of and/or including any of about 0.01%, about 0.1%, about 1%, about 2%, about 4%, about 6%, about 8%, or about 10% by weight of the cement. One of ordinary skill in the art, with the benefit of this disclosure, will recognize the appropriate amount of the secondary cement retarder to include for a chosen application.

Some optional examples of the cement composition may comprise a dispersant. Examples of suitable dispersants include, without limitation, sulfonated-formaldehyde-based dispersants (e.g., sulfonated acetone formaldehyde condensate). Other suitable dispersants may be polycarboxylated ether dispersants.

In some examples, the dispersant may be included in the cement composition in an amount in the range of from about 0.01% to about 5% by weight of the cement. In specific examples, the dispersant may be present in an amount ranging between any of and/or including any of about 0.01%, about 0.1%, about 0.5%, about 1%, about 2%, about 3%, about 4%, or about 5% by weight of the cement. One of ordinary skill in the art, with the benefit of this disclosure, will recognize the appropriate amount of the dispersant to include for a chosen application.

In some optional examples, a viscosifier may be included in the cement composition. The viscosifier may be included to optimize fluid rheology and to stabilize the suspension. Without limitation, examples of viscosifiers include swellable clays such as bentonite or biopolymers such as cellulose derivatives (e.g., hydroxyethyl cellulose, carboxymethyl cellulose, carboxymethyl hydroxyethyl cellulose). The viscosifier may be included in the cement composition in an amount in the range of from about 0.01% to about 0.5% by weight of the cement. In specific examples, the viscosifier may be present in an amount ranging between any of and/or including any of about 0.01%, about 0.05%, about 0.1%, about 0.2%, about 0.3%, about 0.4%, or about 0.5% by weight of the cement. One of ordinary skill in the art, with the benefit of this disclosure, will recognize the appropriate amount of viscosifier to include for a chosen application.

Other optional additives suitable for use in the cementing composition may also be provided as desired for a particular application. Examples of such additives include, but are not limited to, foaming additives, strength-retrogression additives, lightweight additives, gas-generating additives, mechanical-property-enhancing additives, lost-circulation materials, fluid-loss-control additives, defoaming additives, thixotropic additives, and any combination thereof. Specific examples of these, and other, additives include crystalline silica, fumed silica, silicates, salts, fibers, hydratable clays, microspheres, diatomaceous earth, natural pozzolan, zeolite, fly ash, rice hull ash, swellable elastomers, resins, any combination thereof, and the like. A person having ordinary skill in the art, with the benefit of this disclosure, will readily be able to determine the type and amount of additive useful for a particular application and desired result.

Optionally, foaming additives may be included in the cement composition to, for example, facilitate foaming and/or stabilize the resultant foam formed therewith. In particular, the cement composition may be foamed with a foaming additive and a gas. The foaming additive may include a surfactant or combination of surfactants that reduce the surface tension of the water. By way of example, the foaming agent may comprise an anionic, nonionic, amphoteric (including zwitterionic surfactants), cationic surfactant, or mixtures thereof. Examples of suitable foaming additives include, but are not limited to, betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming additives include, but are not limited to, mixtures of an ammonium salt of an alkyl ether sulfate, a cocoamidopropyl betaine surfactant, a cocoamidopropyl dimethylamine oxide surfactant, sodium chloride, and water, mixtures of an ammonium salt of an alkyl ether sulfate surfactant, a cocoamidopropyl hydroxysultaine surfactant, a cocoamidopropyl dimethylamine oxide surfactant, sodium chloride, and water, hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof.

Optionally, strength-retrogression additives may be included in the cement composition to, for example, prevent the retrogression of strength after the cement composition has been allowed to develop compressive strength when the cement composition is exposed to high temperatures. These additives may allow the cement compositions to form as intended, preventing cracks and premature failure of the cementitious composition. Examples of suitable strength-retrogression additives may include, but are not limited to, amorphous silica, coarse grain crystalline silica, fine grain crystalline silica, or a combination thereof.

Optionally, lightweight additives may be included in the cement composition to, for example, decrease the density of the cement composition. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Optionally, gas-generating additives may be included in the cement composition to release gas at a predetermined time, which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Optionally, mechanical-property-enhancing additives may be included in the cement composition to, for example, ensure adequate compressive strength and long-term structural integrity. These properties can be affected by the strains, stresses, temperature, pressure, and impact effects from a subterranean environment. Examples of mechanical-property-enhancing additives include, but are not limited to, carbon fibers, glass fibers, metal fibers, mineral fibers, silica fibers, polymeric elastomers, latexes, and combinations thereof.

Optionally, lost-circulation materials may be included in the cement composition to, for example, help prevent the loss of fluid circulation into the subterranean formation. Examples of lost-circulation materials include, but are not limited to, cedar bark, shredded cane stalks, mineral fiber, mica flakes, cellophane, calcium carbonate, ground rubber, polymeric materials, pieces of plastic, ground marble, wood, nut hulls, formica, corncobs, cotton hulls, and combinations thereof.

Optionally, fluid-loss-control additives may be included in the cement composition to, for example, decrease the volume of fluid that is lost to the subterranean formation. Properties of the cement compositions may be significantly influenced by their water content. The loss of fluid can subject the cement composition to degradation or complete failure of design properties. Examples of suitable fluid-loss-control additives include, but are not limited to, certain polymers, such as hydroxyethyl cellulose, carboxymethylhydroxyethyl cellulose, copolymers of 2-acrylamido-2-methylpropanesul tonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Optionally, defoaming additives may be included in the cement composition to, for example, reduce tendency for the cement composition to foam during mixing and pumping of the cement compositions. Examples of suitable defoaming additives include, but are not limited to, polyol silicone compounds.

Optionally, thixotropic additives may be included in the cement composition to, for example, provide a cement composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The components of the cement composition may be combined in any order desired to form a cement composition that can be placed on a surface and/or into a subterranean formation. In addition, the components of the cement composition may be combined using any mixing device compatible with the composition, including a bulk mixer for example. In some embodiments, a cement composition may be prepared by combining the dry components (which may be the cement component, for example) with water. Liquid additives (if any) may be combined with the water before the water is combined with the dry components. The dry components may be dry blended prior to their combination with the water. For example, a dry blend may be prepared that comprises the cement retarder and the dry cement component. Other suitable techniques may be used for preparation of the cement composition will be appreciated by those of ordinary skill in the art in accordance with the disclosed examples.

The cement composition generally has a density suitable for a particular application. By way of example, the cement compositions may have a density in the range of from about 4 pounds per gallon ("lb/gal") to about 20 lb/gal. In certain examples, the cement composition may have a density in the range of from about 8 lb/gal to about 17 lb/gal. Examples of the cement composition may be foamed or unfoamed or may comprise other means to reduce their densities, such as hollow microspheres, low-density elastic beads, or other density-reducing additives known in the art. In some examples, the density may be reduced after storing the composition, but prior to placement in a subterranean formation. Those of ordinary skill in the art, with the benefit of this disclosure, will recognize the appropriate density for a particular application.

In some examples, the cement composition may set to have a desirable compressive strength after the period of delay induced by the cement retarder has ended. Compressive strength is generally the capacity of a material or structure to withstand axially directed pushing forces. The compressive strength may be measured when the cement composition is maintained under specified temperature and pressure conditions. Compressive strength can be measured by either destructive or non-destructive methods. The destructive method physically tests the strength of cement composition samples at various points in time by crushing the samples in a compression-testing machine. The compressive strength is calculated from the failure load divided by the cross-sectional area resisting the load and is reported in units of pound-force per square inch (psi). Non-destructive methods may employ an ultrasonic cement analyzer. Compressive strength values may be determined in accordance with API RP Practice 10B-2, Recommended Practice for Testing Well Cements, Second Edition, R2019.

By way of example, the cement composition may develop a 24-hour compressive strength in the range of from about 50 psi to about 5000 psi, alternatively, from about 100 psi to about 4500 psi, or alternatively from about 500 psi to about 4000 psi. In some examples, the cement composition may develop a compressive strength in 24 hours of at least about 50 psi, at least about 100 psi, at least about 500 psi, or more. In some examples, the compressive strength values may be determined using destructive or non-destructive methods at a temperature ranging from about 40° F. (or lower) to about 500° F. (or higher).

In some examples, the cement composition may have a desired thickening time after addition of the cement retarder. Thickening time typically refers to the time a fluid, such as a cement composition, remains in a fluid state capable of being pumped. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement composition may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

In some optional examples a cement accelerator may be added to the cement composition either before, during, or after the cement composition is introduced downhole. In addition to, or alternatively, a cement set activator may be added to the cement composition before, during, or after the cement composition is introduced downhole. The term "cement set activator" or "activator," as used herein, refers to an additive that activates a retarded cement composition and may also in certain systems accelerate the setting of a retarded cement composition. By way of example, the retarded cement composition may be activated to form a hardened mass in a time period in the range of from about 1 hour to about 12 hours. For example, a retarded cement composition may set to form a hardened mass in a time period ranging between any of and/or including any of about 1 hour, about 2 hours, about 4 hours, about 6 hours, about 8 hours, about 10 hours, or about 12 hours.

Examples of suitable cement set activators include, but are not limited to, zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some examples, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the cement composition, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In a specific example, the activator may be provided and added to the cement composition as a liquid additive, for example, a liquid additive comprising a monovalent salt, a polyphosphate, and optionally a dispersant.

Some optional examples may include a cement set activator comprising a combination of a monovalent salt and a polyphosphate. The monovalent salt and the polyphosphate may be combined prior to addition to the cement composition or may be separately added to the cement composition. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates may be used as a cement set activator for embodiments of the cement compositions disclosed herein. The ratio of the monovalent salt to the polyphosphate may range, for example, from about 5:1 to about 1:25 or from about 1:1 to about 1:10. Embodiments of the cement set activator may comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some examples, the combination of the monovalent salt and the polyphosphate may be mixed with a dispersant and water to form a liquid additive for activation of a retarded cement composition. Examples of suitable dispersants include, without limitation, the previously described dispersants, such as sulfonated-formaldehyde-based dispersants and polycarboxylated ether dispersants. The liquid additive may function as a cement set activator. As discussed above, a cement set activator may also accelerate the setting of the retarded cement composition. The use of a liquid additive to accelerate a retarded cement composition is dependent upon the compositional makeup of the liquid additive as well as the compositional makeup of the retarded cement composition. With the benefit of this disclosure, one of ordinary skill in the art should be able to formulate a liquid additive to activate and/or accelerate a retarded cement composition.

In some optional examples, the cement set activator may be added to the retarded cement composition in an amount sufficient to induce the retarded cement composition to set into a hardened mass. In certain examples, the cement set activator may be added to the retarded cement composition in an amount in the range of about 0.1% to about 20% by weight of the cement. In specific examples, the cement set activator may be present in an amount ranging between any of and/or including any of about 0.1%, about 1%, about 5%, about 10%, about 15%, or about 20% by weight of the cement. One of ordinary skill in the art, with the benefit of this disclosure, will recognize the appropriate amount of cement set activator to include for a chosen application.

Examples of the cement compositions may be used in a variety of cementing operations such as surface cementing operations (e.g., construction) and subterranean cementing operations (e.g., primary and remedial cementing). As an example, a cement composition may be provided that comprises water, cement, and a cement retarder derived from the waste stream of the manufacturing process of a sweetener. The cement composition may be introduced into a subterranean formation and allowed to set therein. As used herein, introducing the cement composition into a subterranean formation includes introduction into any portion of the subterranean formation, including, without limitation, into a wellbore drilled into the subterranean formation, into a near wellbore region surrounding the wellbore, or into both.

In some example primary cementing methods, the cement composition may be introduced into an annular space between a conduit located in a wellbore and the walls of a wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also support the conduit in the wellbore.

In some example remedial cementing methods, a cement composition may be used for squeeze-cementing operations or in the placement of cement plugs. By way of example, the cement composition may be placed in a wellbore to plug an opening (e.g., a void or crack) in the formation, in a gravel pack, in the conduit, in the cement sheath, and/or between the cement sheath and the conduit (e.g., a microannulus).

Figure 1:
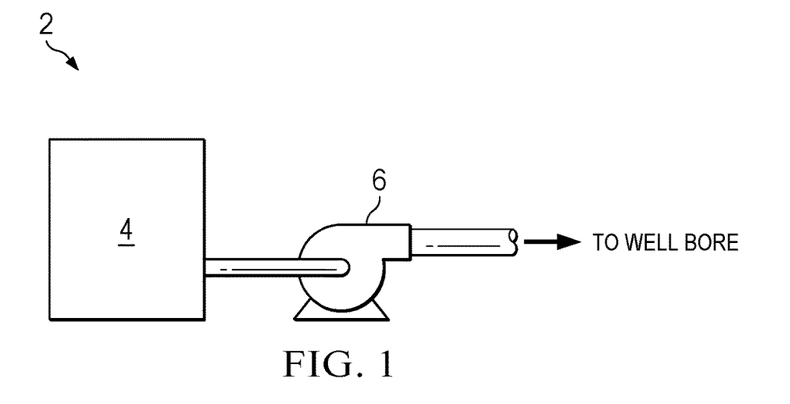
FIG. 1 is a schematic illustrating pumping and mixing equipment for cementing with a retarded cement composition in accordance with one or more examples described herein.

Referring now to FIG. 1, preparation of a retarded cement composition will now be described. FIG. 1 is an illustration of a system 2 for preparation of a retarded cement composition and delivery to a wellbore in accordance with certain examples. As shown, the cement composition may be mixed in mixing equipment 4, such as a jet mixer, re-circulating mixer, or a batch mixer, and then pumped via pumping equipment 6 to the wellbore. In some examples, the mixing equipment 4 and the pumping equipment 6 may be disposed on one or more cement trucks as will be apparent to those of ordinary skill in the art. In some examples, a jet mixer may be used to continuously mix the cement and the cement retarder with the water as it is being pumped to the wellbore. In some examples, a re-circulating mixer and/or a batch mixer may be used to mix the cement and the cement retarder may be added to the mixer as a liquid or a powder prior to pumping the retarded cement composition downhole.

Figure 2:
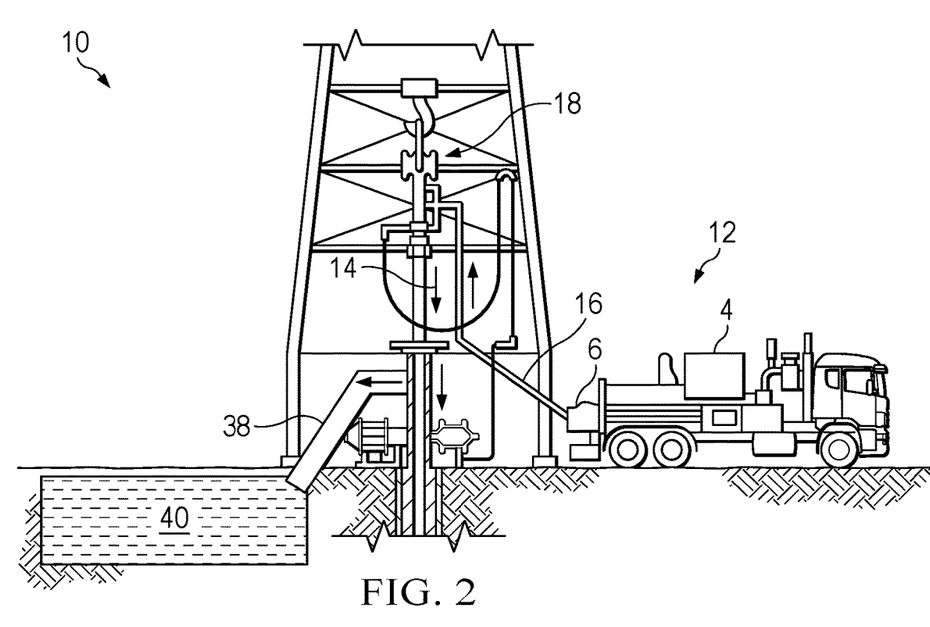
FIG. 2 is a schematic illustrating surface equipment for cementing with a retarded cement composition in accordance with one or more examples described herein.

An example technique for placing a cement composition into a subterranean formation will now be described with reference to FIGS. 2 and 3. FIG. 2 illustrates surface equipment 10 that may be used in placement of a cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6. The cementing unit 12 may pump a retarded cement composition 14 through a feed pipe 16 and to a cementing head 18 which conveys the retarded cement composition 14 downhole.

Figure 3:
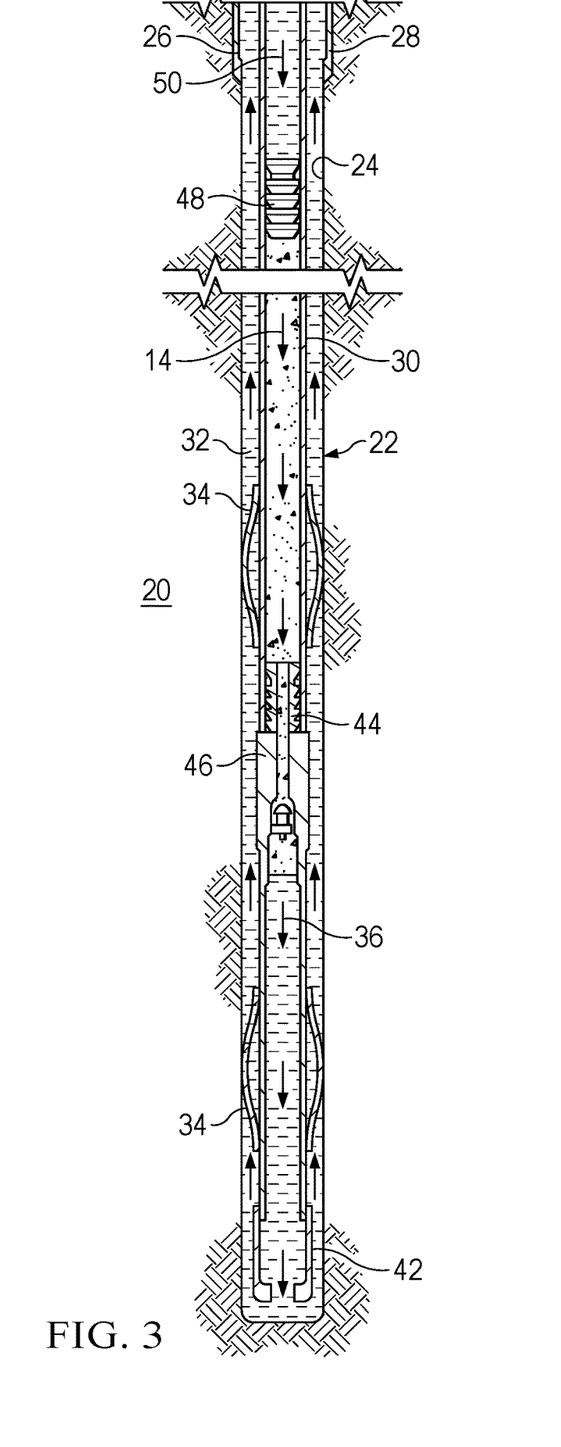
FIG. 3 is a schematic illustrating wellbore equipment for cementing with a retarded cement composition in accordance with one or more examples described herein.

Turning now to FIG. 3, the retarded cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30, may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, the retarded cement composition 14 may be pumped down the interior of the casing 30. The retarded cement composition 14 may be allowed to flow down the interior of the casing 30 through the casing shoe 42 at the bottom of the casing 30 and up around the casing 30 into the wellbore annulus 32. The retarded cement composition 14 may be allowed to set in the wellbore annulus 32, for example, to form a cement sheath that supports and positions the casing 30 in the wellbore 22. While not illustrated, other techniques may also be utilized for introduction of the retarded cement composition 14. By way of example, reverse circulation techniques may be used that include introducing the retarded cement composition 14 into the subterranean formation 20 by way of the wellbore annulus 32 instead of through the casing 30.

As it is introduced, the retarded cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the retarded cement composition 14 to separate the retarded cement composition 14 from the other fluids 36 that may be inside the casing 30 prior to cementing. After the bottom plug 44 reaches the landing collar 46, a diaphragm or other suitable device should rupture to allow the retarded cement composition 14 through the bottom plug 44. In FIG. 3, the bottom plug 44 is shown on the landing collar 46. In the illustrated embodiment, a top plug 48 may be introduced into the wellbore 22 behind the retarded cement composition 14. The top plug 48 may separate the retarded cement composition 14 from a displacement fluid 50 and also push the retarded cement composition 14 through the bottom plug 44.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

It should be clearly understood that the example systems illustrated by FIGS. 1-3 are merely a general application of the principles of this disclosure in practice, and a wide variety of other examples are possible. Therefore, the scope of this disclosure is not limited in any manner to the details of FIGS. 1-3 as described herein.

Figure 4:
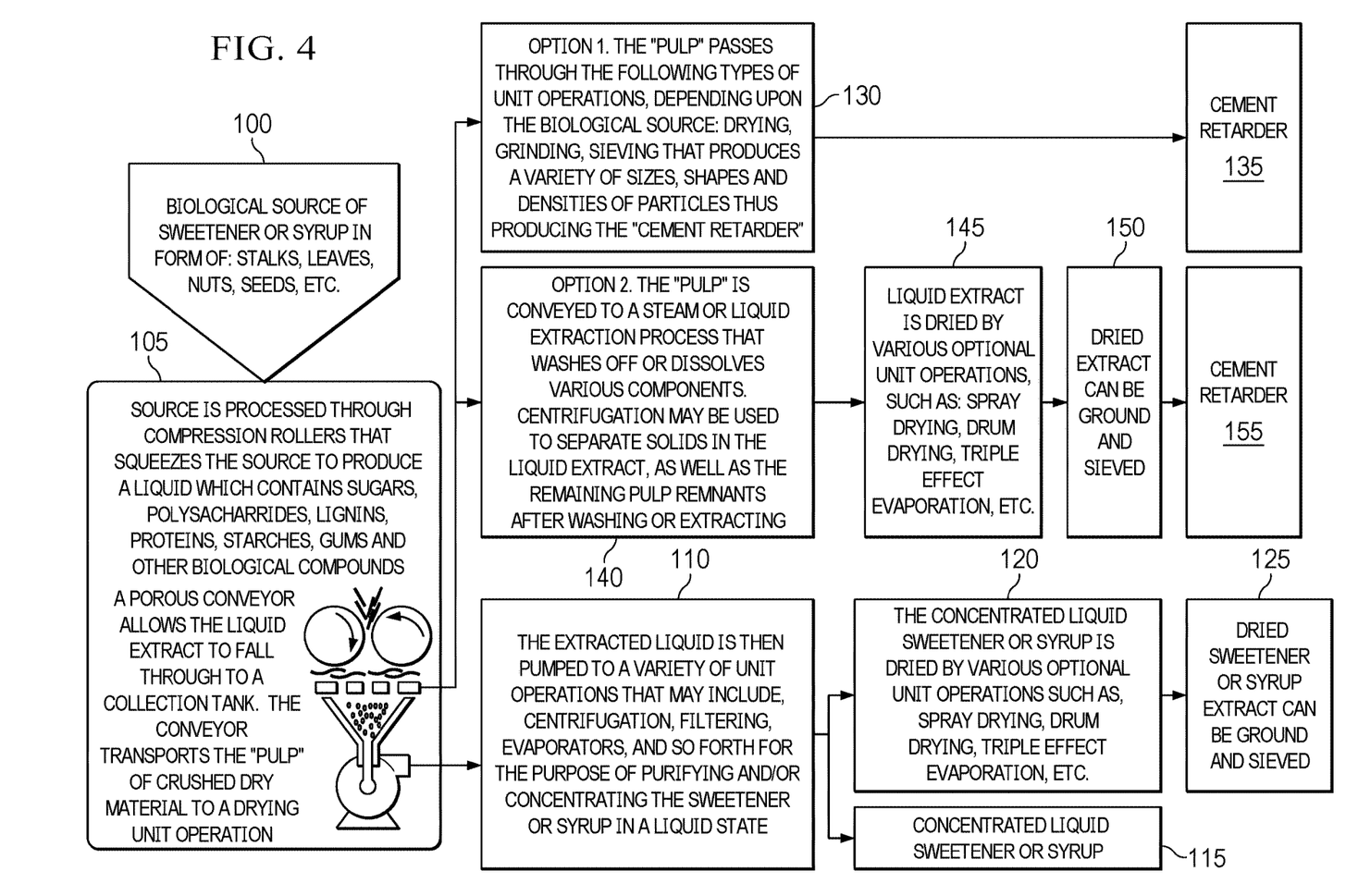
FIG. 4 is a flow chart illustrating an example of the unit operations that used to extract the cement retarder from one or more sweetener manufacturing processes in accordance with one or more examples described herein.

FIG. 4 is a flow chart illustrating an example of the unit operations that may be used to extract the cement retarder from one or more sweetener manufacturing processes. The example illustrated by FIG. 4 is just an example of potential manufacturing processes. Examples of the manufacturing processes may include, but are not limited to, producing dry granular sugar from sugar cane; producing concentrated maple syrup from maple sap; producing granular concentrated sweetener from plant leaves; and the like. At box 100, the biological source is obtained. Examples of potential biological sources include, but are not limited to, stalks, leaves, nuts, seeds, and the like which may be obtained from various plants. At box 105, the biological source is processed. An example of the processing is depicted as compression rollers that squeeze the biological source to produce a liquid. The extracted liquid may contain sugars, polysaccharides, lignin, protein, starches, gums, and other biological compounds. The extracted liquid is sieved via a porous conveyor to a collection tank. The conveyor transports the "pulp" of the crushed source material to a drying unit operation. At box 110 the extracted liquid is pumped to any of a variety of unit operations that may include, but are not limited to, centrifugation, filtering, evaporators, and the like for the purpose of purifying and/or concentrating the sweetener in a liquid state. At box 115 the concentrated liquid sweetener is removed from the unit operation and manufacturing is completed. At box 120 the concentrated liquid sweetener may be dried by various unit operations, including but not limited to, spray drying, drum drying, triple effect evaporation, etc. These drying operations are optional and as shown in box 115, the processed liquid sweetener may instead be used directly without drying if desired. At box 125 the dried sweetener extract can be ground and sieved if desired for other operations. With continued reference to FIG. 4, two potential operations are described to further process the "pulp" obtained as the byproduct from the process illustrated in box 105. It is to be understood that the two potential operations are merely illustrative and should not be interpreted as being exhaustive. Other non-illustrated potential processing operations may be used to provide the cement retarder. At box 130, the first potential option is described. The "pulp" from box 105 is passed through a processing operation dependent upon the biological source including, but not limited to, drying, grinding, sieving that produces a variety of sizes, shapes and densities of particles, and the like. The result of this processing is the cement retarder as designated in box 135. The second potential option is described in box 140. The "pulp" is conveyed to a steam or liquid extraction process that washes off or dissolves various components. Centrifugation may be used to separate the solids from the liquid extract, as well as the remaining pulp remnants after washing or extracting. At box 145, the liquid extract is further processed with a drying operation including, but not limited to, spray drying, drum drying, triple effect evaporation, etc. At box 150 the dried extract can be ground and sieved to produce the cement retarder as designated in box 155.

EXAMPLES

The present disclosure may be better understood by reference to the following examples, which are offered by way of illustration. The present disclosure is not limited to the examples provided herein.

Example 1

Example 1 illustrates an example experiment to measure the rheological properties of various cement compositions comprising a cement retarder of a residue derived from the manufacturing process of a sweetener. These experimental compositions were compared with a control cement composition comprising diutan gum. The rheological properties of the sample were measured using a Model 35A Fann® Viscometer and a No. 2 spring with a Fann® Yield Stress Adapter (FYSA), in accordance with the procedure set forth in API RP Practice 10B-2, Recommended Practice for Testing Well Cements, Second Edition, R2019. The decay rheology was measured at both 80° F. and 165° F. The free water was measured at 165° F. The cement composition formulations are presented in Table 1, and the rheology and free water results are presented in Table 2 below.

TABLE 1

Sample Formulations

| Sample # | Density lb/gal | Water gal/sk | Cement Class H | Diutan Gum % bwoc | Experimental Residue % bwoc |
|---|---|---|---|---|---|
| 1 | 15.6 | 5.33 | 100 | — | — |
| 2 | 15.6 | 5.32 | 100 | 0.1 | — |
| 3 | 15.6 | 5.32 | 100 | — | 0.1 |
| 4 | 15.6 | 5.32 | 100 | 0.2 | — |
| 5 | 15.6 | 5.32 | 100 | — | 0.2 |
| 6 | 15.6 | 5.32 | 100 | 0.4 | — |
| 7 | 15.6 | 5.31 | 100 | — | 0.4 |

*bwoc = by weight of cement

TABLE 2

Decay and Free Water Results

| Sample # | Temperature ° F. | RPM 3 | RPM 6 | RPM 30 | RPM 60 | RPM 100 | RPM 200 | RPM 300 | RPM 600 | Free Water |
|---|---|---|---|---|---|---|---|---|---|---|
| 1 | 80 | 7 | 9 | 13 | 15 | 19 | 26 | 33 | 52 | |
| 1 | 180 | 11 | 15 | 34 | 39 | 42 | 48 | 52 | 61 | 2 mL |
| 2 | 80 | 25 | 35 | 45 | 49 | 60 | 91 | 120 | 191 | |
| 2 | 165 | 24 | 28 | 51 | 56 | 61 | 68 | 82 | 105 | 2 mL |
| 3 | 80 | 5 | 6 | 9 | 12 | 14 | 20 | 29 | 47 | |
| 3 | 165 | 15 | 21 | 51 | 59 | 65 | 74 | 86 | 103 | 4 mL |
| 4 | 80 | 32 | 43 | 72 | 81 | 100 | 142 | 183 | 279 | |
| 4 | 165 | 37 | 45 | 75 | 88 | 118 | 157 | 187 | 254 | 0 mL |
| 5 | 80 | 4 | 5 | 7 | 10 | 12 | 17 | 24 | 45 | |
| 5 | 165 | 16 | 27 | 72 | 86 | 95 | 106 | 114 | 125 | 2 mL |
| 6 | 80 | 47 | 56 | 96 | 158 | 200 | 260 | 300+ | 300+ | |
| 6 | 165 | 48 | 56 | 105 | 162 | 199 | 262 | 300+ | 300+ | 0 mL |
| 7 | 80 | 3 | 4 | 6 | 8 | 10 | 15 | 21 | 42 | |
| 7 | 165 | 22 | 38 | 95 | 115 | 125 | 37 | 161 | 184 | 1 mL |

Example 2

Example 2 illustrates an example experiment to measure the rheological properties of various cement compositions comprising a cement retarder of a residue derived from the manufacturing process of a sweetener. These experimental compositions were compared with a control cement composition comprising diutan gum. The rheological properties of the sample were measured using a Model 35A Fann® Viscometer and a No. 2 spring with a Fann® Yield Stress Adapter (FYSA), in accordance with the procedure set forth in API RP Practice 10B-2, Recommended Practice for Testing Well Cements, Second Edition, R2019, Recommended Practice for Testing Well Cements. The apparent viscosities were calculated using the torque dial readings and the calibrated factors that convert RPM to shear rate and dial readings to shear stress. The free water results are also presented. The cement composition formulations and results are presented in Table 3 below.

TABLE 3

Apparent Viscosity and Free Water Results

| Sample No. | Diutan Gum % bwoc | Experimental Residue % bwoc | SR = 511 1/sec, 80° F. | SR = 511 1/sec, 165° F. | Free Water at 165° F. |
|---|---|---|---|---|---|
| 8 | 0 | 0 | 75 | 195 | 2 |
| 9 | 0.1 | — | 245 | 280 | 2 |
| 10 | — | 0.1 | 60 | 295 | 4 |
| 11 | 0.2 | — | 405 | 440 | 0 |
| 12 | — | 0.2 | 50 | 430 | 2 |
| 13 | 0.4 | — | 790 | 810 | 0 |
| 14 | — | 0.4 | 40 | 575 | 1 |

Figure 5:
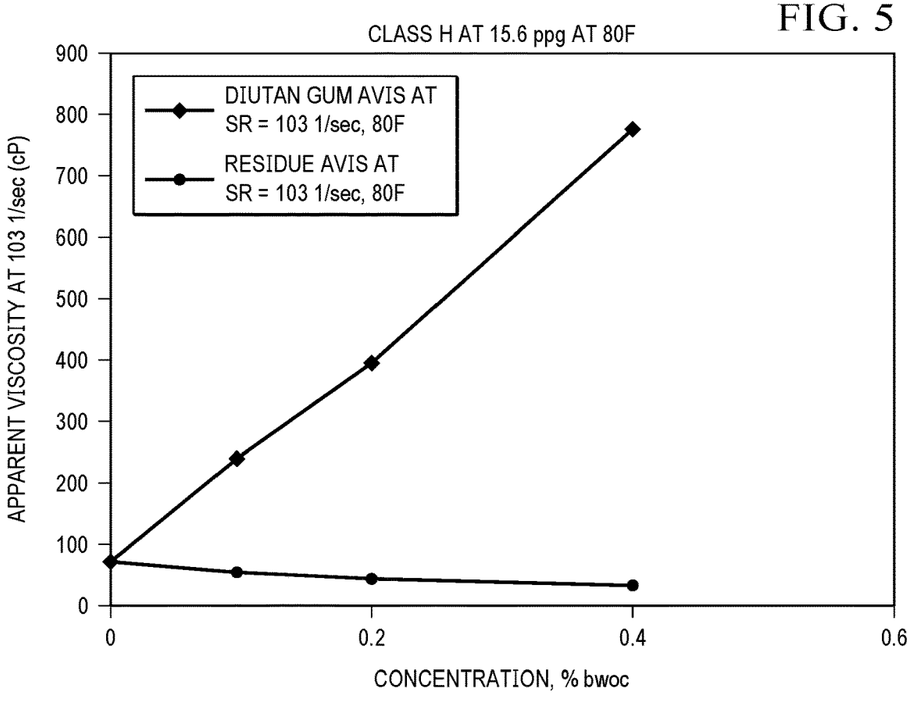
FIG. 5 is a graph illustrating the rheology of a retarded cement composition at 80° F. in accordance with one or more examples described herein.
Figure 6:
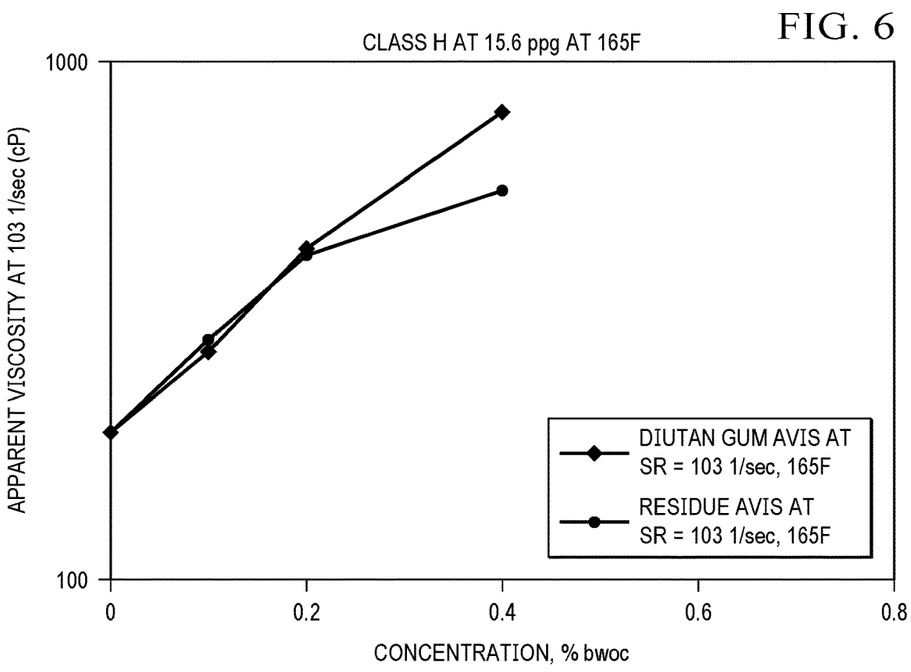
FIG. 6 is a graph illustrating the rheology of a retarded cement composition at 165° F. in accordance with one or more examples described herein.
Figure 7:
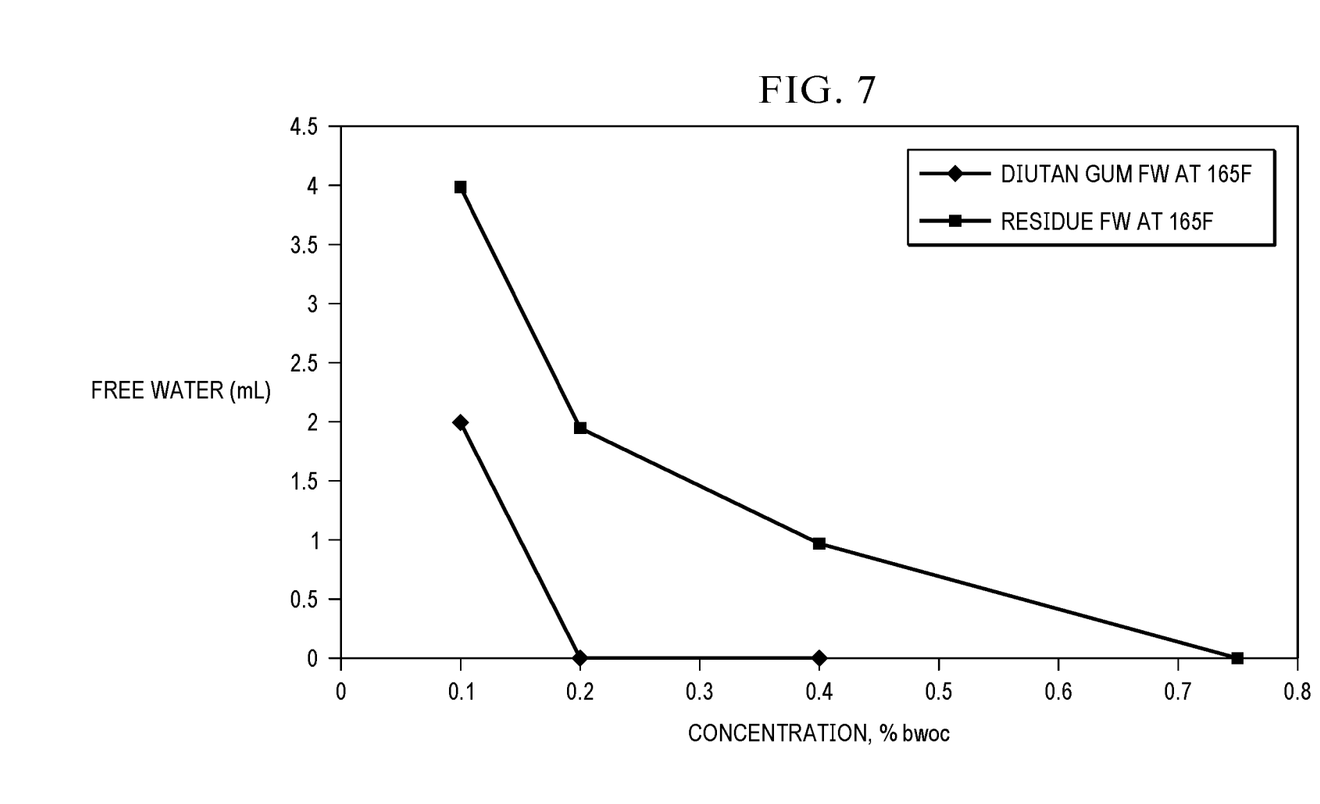
FIG. 7 is a graph illustrating the free water of a retarded cement composition at 165° F. in accordance with one or more examples described herein.

FIG. 5 is a graph of the apparent viscosity measurement at 80° F. FIG. 6 is a graph of the apparent viscosity measurement at 165° F. FIG. 7 is a graph of the free water measurement at 165° F.

Example 3

Example 3 illustrates an example experiment to measure the thickening time of various cement compositions comprising a cement retarder of a residue derived from the manufacturing process of a sweetener. The thickening time was measured using a pressurized consistometer set at a 159° F. bottom hole circulating temperature, and the end point was the time taken to reach 70 Bc. The measurement was performed in accordance with the procedure for determining cement thickening times set forth in API Schedule 16. The cement retarder concentrations and results are presented in Table 4 below. Table 5 provides a comparison of the cement retarder and maltodextrin at a concentration of 0.2% bwoc.

TABLE 4

Thickening Time Comparison

| Concentration % bwoc | Residue thickening time to 70 Bc (Hr.) |
|---|---|
| 0.1 | 2.83 |
| 0.11 | 3.17 |
| 0.2 | 6.5 |

TABLE 5

Thickening Time Comparison with Maltodextrin

| Concentration % bwoc | Maltodextrin thickening time to 70 Bc (Hr.) | Residue thickening time to 70 Bc (Hr.) |
|---|---|---|
| 0.2 | 3.17 | 6.5 |

It is also to be recognized that the disclosed cement compositions may also directly or indirectly affect the various downhole equipment and tools that may contact the cement compositions disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-3.

Provided are methods of cementing in a subterranean formation in accordance with the disclosure and the illustrated FIGs. An example method comprises providing a cement composition comprising an aqueous fluid, a cement, and a cement retarder; wherein the cement retarder is a waste residue from a manufacturing process of a sweetener and comprises a sugar concentration of at least 40%, a Brix value of at least 60, a nitrogen-free extract concentration of at least 50%, a total solids concentration of at least 60%, a crude protein concentration less than 10%, a fat concentration less than 5%, a fiber concentration less than 5%, and an ash concentration less than 10%. The method further comprises introducing the cement composition into a wellbore penetrating a subterranean formation; pumping the cement composition to a location within the wellbore; and allowing the cement composition to set in the location.

Additionally or alternatively, the method may include one or more of the following features individually or in combination. The manufacturing process of a sweetener may be the manufacturing process of a molasses selected from the group consisting of cane molasses, sugar beet molasses, fruit molasses, citrus molasses, starch molasses, unsulfured molasses, hemicellulose extract, beet molasses, grain molasses, sorghum molasses, any combination thereof. The source of the sweetener may be sugar cane, beet, citrus, maize, grain sorghum, the leaves of the stevia plant, pineapple, and any combination thereof. The cement retarder may be present in the cement composition in an amount of about 0.1% to about 15% by weight of the cement. The cement may be selected from the group consisting of Portland cements, pozzolanic cements, gypsum cements, high alumina content cements, silica cements, high alkalinity cements, slag cements, shale cements, cement kiln dust, and any combination thereof. The cement composition may further comprise an additive selected from the group consisting of foaming additives, strength-retrogression additives, lightweight additives, gas-generating additives, mechanical-property-enhancing additives, lost-circulation materials, fluid-loss-control additives, defoaming additives, thixotropic additives, and any combination thereof. The cement composition may have a density in the range of from about 4 pounds per gallon to about 20 pounds per gallon. The method may further comprise obtaining the waste product from the manufacturing process of the sweetener and extracting the residue from the waste product. The residue may be derived from the waste product by solidifying the waste product, condensing the waste product, drying the waste product, filtering the waste product, or a combination thereof.

Provided are cement compositions for cementing in a subterranean formation in accordance with the disclosure and the illustrated FIGs. An example cement composition comprises an aqueous fluid, a cement, and a cement retarder; wherein the cement retarder is a waste residue from a manufacturing process of a sweetener and comprises a sugar concentration of at least 40%, a Brix value of at least 60, a nitrogen-free extract concentration of at least 50%, a total solids concentration of at least 60%, a crude protein concentration less than 10%, a fat concentration less than 5%, a fiber concentration less than 5%, and an ash concentration less than 10%.

Additionally or alternatively, the cement composition may include one or more of the following features individually or in combination. The manufacturing process of a sweetener may be the manufacturing process of a molasses selected from the group consisting of cane molasses, sugar beet molasses, fruit molasses, citrus molasses, starch molasses, unsulfured molasses, hemicellulose extract, beet molasses, grain molasses, sorghum molasses, any combination thereof. The source of the sweetener may be sugar cane, beet, citrus, maize, grain sorghum, the leaves of the stevia plant, pineapple, and any combination thereof. The cement retarder may be present in the cement composition in an amount of about 0.1% to about 15% by weight of the cement. The cement may be selected from the group consisting of Portland cements, pozzolanic cements, gypsum cements, high alumina content cements, silica cements, high alkalinity cements, slag cements, shale cements, cement kiln dust, and any combination thereof. The cement composition may further comprise an additive selected from the group consisting of foaming additives, strength-retrogression additives, lightweight additives, gas-generating additives, mechanical-property-enhancing additives, lost-circulation materials, fluid-loss-control additives, defoaming additives, thixotropic additives, and any combination thereof. The cement composition may have a density in the range of from about 4 pounds per gallon to about 20 pounds per gallon.

Provided are systems for cementing in a subterranean formation in accordance with the disclosure and the illustrated FIGs. An example system comprises a cement composition comprising: an aqueous fluid, a cement, and a cement retarder; wherein the cement retarder is a waste residue from a manufacturing process of a sweetener and comprises a sugar concentration of at least 40%, a Brix value of at least 60, a nitrogen-free extract concentration of at least 50%, a total solids concentration of at least 60%, a crude protein concentration less than 10%, a fat concentration less than 5%, a fiber concentration less than 5%, and an ash concentration less than 10%. The system further comprises mixing equipment configured to mix the aqueous fluid, the cement, and the cement retarder to provide the cement composition, and pumping equipment configured to pump the cement composition into a wellbore penetrating a subterranean formation.

Additionally or alternatively, the system may include one or more of the following features individually or in combination. The manufacturing process of a sweetener may be the manufacturing process of a molasses selected from the group consisting of cane molasses, sugar beet molasses, fruit molasses, citrus molasses, starch molasses, unsulfured molasses, hemicellulose extract, beet molasses, grain molasses, sorghum molasses, any combination thereof. The source of the sweetener may be sugar cane, beet, citrus, maize, grain sorghum, the leaves of the stevia plant, pineapple, and any combination thereof. The cement retarder may be present in the cement composition in an amount of about 0.1% to about 15% by weight of the cement. The cement may be selected from the group consisting of Portland cements, pozzolanic cements, gypsum cements, high alumina content cements, silica cements, high alkalinity cements, slag cements, shale cements, cement kiln dust, and any combination thereof. The cement composition may further comprise an additive selected from the group consisting of foaming additives, strength-retrogression additives, lightweight additives, gas-generating additives, mechanical-property-enhancing additives, lost-circulation materials, fluid-loss-control additives, defoaming additives, thixotropic additives, and any combination thereof. The cement composition may have a density in the range of from about 4 pounds per gallon to about 20 pounds per gallon.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for cementing in a subterranean formation, comprising:
    obtaining pulp waste residue from a sweetener manufacturing process; wherein the source of a sweetener for the sweetener manufacturing process is sugar cane, beet, citrus, maize, grain sorghum, pineapple, and any combination thereof;
    processing the pulp waste residue by washing the pulp waste residue with a liquid or steam, then extracting the liquid effluent from the washed pulp waste residue, then drying the extracted liquid effluent to produce a dried extract, and then grinding and/or sieving the dried extract to produce the cement retarder; wherein the cement retarder comprises a sugar concentration of at least 40%, a Brix value of at least 60, a nitrogen-free extract concentration of at least 50%, a total solids concentration of at least 60%, a crude protein concentration less than 10%, a fat concentration less than 5%, a fiber concentration less than 5%, and an ash concentration less than 10%;
    providing a cement composition comprising an aqueous fluid, a cement, and the cement retarder;
    introducing the cement composition into a wellbore penetrating a subterranean formation;
    pumping the cement composition to a location within the wellbore; and
    allowing the cement composition to set in the location.

2. The method of claim 1, wherein the sweetener manufacturing process is the sweetener manufacturing process of a molasses selected from the group consisting of cane molasses, sugar beet molasses, fruit molasses, citrus molasses, starch molasses, unsulfured molasses, hemicellulose extract, beet molasses, grain molasses, sorghum molasses, and any combination thereof.

3. The method of claim 1, wherein the cement retarder is present in the cement composition in an amount of about 0.1% to about 15% by weight of the cement.

4. The method of claim 1, wherein the cement is selected from the group consisting of Portland cements, pozzolanic cements, gypsum cements, high alumina content cements, silica cements, high alkalinity cements, slag cements, shale cements, cement kiln dust, and any combination thereof.

5. The method of claim 1, wherein the cement composition further comprises an additive selected from the group consisting of foaming additives, strength-retrogression additives, lightweight additives, gas-generating additives, mechanical-property-enhancing additives, lost-circulation materials, fluid-loss-control additives, defoaming additives, thixotropic additives, and any combination thereof.

6. The method of claim 1, wherein the cement composition has a density in the range of from about 4 pounds per gallon to about 20 pounds per gallon.

7. The method of claim 1, wherein the cement composition is free of suspending aids and/or viscosifiers.

8. The method of claim 1, wherein the cement composition is introduced into the subterranean formation during a remedial cementing operation.

* * * * *